United States Patent
Zhong et al.

(10) Patent No.: US 11,970,598 B2
(45) Date of Patent: Apr. 30, 2024

(54) REINFORCED INTUMESCENT POLYMER

(71) Applicant: ABB Schweiz AG, Baden (CH)

(72) Inventors: Sheng Zhong, Hillsborough, NC (US); Marius Rutkevicius, Raleigh, NC (US)

(73) Assignee: ABB SCHWEIZ AG, Baden (CH)

(*) Notice: Subject to any disclaimer, the term of this patent is extended or adjusted under 35 U.S.C. 154(b) by 765 days.

(21) Appl. No.: 16/987,680

(22) Filed: Aug. 7, 2020

(65) Prior Publication Data

US 2022/0041840 A1 Feb. 10, 2022

(51) Int. Cl.
- *C09K 9/00* (2006.01)
- *C08J 9/18* (2006.01)
- *C08K 3/04* (2006.01)
- *C08K 5/00* (2006.01)
- *C08K 7/24* (2006.01)
- *C08K 9/06* (2006.01)

(52) U.S. Cl.
CPC .................. *C08K 9/06* (2013.01); *C08J 9/18* (2013.01); *C08K 3/04* (2013.01); *C08K 5/0066* (2013.01); *C08K 7/24* (2013.01); *C08J 2201/022* (2013.01); *C08J 2201/03* (2013.01); *C08J 2327/06* (2013.01)

(58) Field of Classification Search
CPC .......... C08K 3/04; C08K 5/0066; C08K 7/24; C08K 9/06; C08J 9/18; C08J 2201/022; C08J 2322/06
See application file for complete search history.

(56) References Cited

U.S. PATENT DOCUMENTS

| | | | |
|---|---|---|---|
| 6,031,040 A | 2/2000 | Horacek | |
| 6,669,919 B1 | 12/2003 | Greinke | |
| 6,747,074 B1 | 6/2004 | Buckingham et al. | |
| 2003/0125447 A1 | 7/2003 | Hoch et al. | |
| 2004/0209982 A1 | 10/2004 | Horacek | |
| 2009/0110919 A1 | 4/2009 | Panse | |
| 2014/0094539 A1 | 4/2014 | Bilbija | |
| 2014/0364524 A1* | 12/2014 | Braun | C08J 9/141 521/121 |
| 2015/0203731 A1 | 7/2015 | Herrlich et al. | |
| 2017/0029632 A1 | 2/2017 | Couturier | |
| 2017/0037318 A1 | 2/2017 | Muenzenberger et al. | |
| 2017/0044442 A1 | 2/2017 | Muenzenberger et al. | |
| 2018/0087695 A1 | 3/2018 | Mentink | |
| 2019/0309117 A1 | 10/2019 | Zhang et al. | |
| 2019/0341758 A1 | 11/2019 | Zant et al. | |
| 2020/0002552 A1 | 1/2020 | Song et al. | |

FOREIGN PATENT DOCUMENTS

| | | |
|---|---|---|
| EP | 1 659 157 A1 | 5/2006 |
| EP | 1 794 231 B1 | 6/2011 |
| EP | 2 585 518 B1 | 3/2017 |

OTHER PUBLICATIONS

Of Chiang, CL., Hsu, SW. (Novel epoxy/expandable graphite halogen-free flame retardant composites?preparation, characterization, and properties. J Polym Res 17, 315-323 (2010) (Year: 2010).*

Mariappan, Thirumal, "Recent developments of intumescent fire protection coating for structural steel: A review", Journal for Fire Sciences, 2016, vol. 34(2) 120-163; DOI: 10.1177/0734904115626720, 44 pp.

* cited by examiner

*Primary Examiner* — Edward J Cain

(74) *Attorney, Agent, or Firm* — Greenberg Traurig, LLP

(57) ABSTRACT

An intumescent polymer is provided for molding fire-retardant structures. Expandable graphite is mixed in a polymer matrix to form the intumescent polymer. The expandable graphite is treated with silane to improve the strength of the polymer. Other ingredients may also be included within the polymer, including an acid source, blowing agent, char forming agent, an inorganic filler and a cross-linking agent.

16 Claims, 2 Drawing Sheets

REINFORCED INTUMESCENT POLYMER

BACKGROUND

The present inventions relate generally to fire-retardant materials, and more particularly, to an intumescent material that is reinforced to increase mechanical strength.

Intumescent thermoplastics have been used in injection molding to make fire-retardant components. In many cases, expandable graphite is the main ingredient of the resin. Expandable graphite is typically used to improve foaming action which produces worm-like structures upon heating. By mixing expandable graphite into the resin, the properties of the base polymers change. For example, the mechanical strength of the intumescent plastic decreases with expandable graphite content. The negative effect of graphite on mechanical strength of polymer blends has been previously identified. Expandable graphite has low inter-particle friction which leads to a reduction in mechanical properties of composites with expandable graphite. Also, when expandable graphite particles are incorporated into a polymer matrix, the particles create discontinuities in the polymer chains as well as local stress concentrations. When the composite is under load, small cracks may initiate at stress concentrated points and propagate through the matrix which eventually causes structural failure of the component. Increasing graphite fillers further destroys the integrity of the polymer matrix and decreases the mechanical strength of composites.

SUMMARY

An intumescent polymer is described with improved strength. The intumescent polymer has a polymer matrix and expandable graphite mixed therein. The expandable graphite is treated with silane. The intumescent polymer may also include an acid source, blowing agent, char forming agent, an inorganic filler and a cross-linking agent. If desired, any of the components may include multiple ingredients to form the particular component. The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
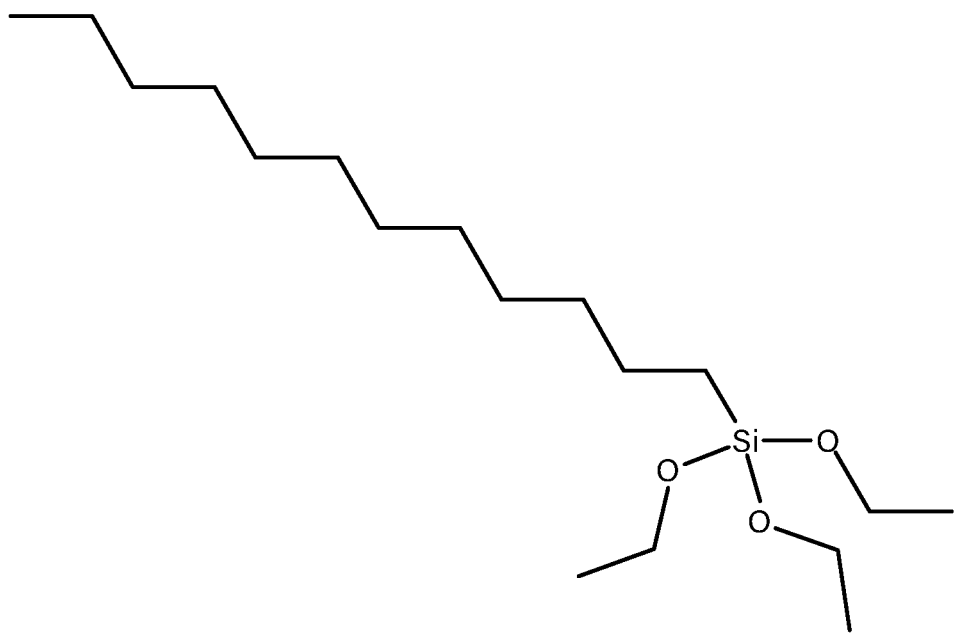
FIG. 1 is an illustration of dodecyltriethoxysilane.

The inventions herein present a new chemistry to compound an intumescent plastic blend with improved mechanical strength. In order to improve the material stiffness the interaction of inorganic fillers with an organic matrix is enhanced and the graphite-graphite inter-particle friction is increased. Aliphatic polymer chains may be grafted onto filler surfaces and may interact and entangle with a polymer matrix to increase binding among the fillers and the matrix. At the same time, the long aliphatic chains may increase shear viscosity which leads to an enhanced mechanical strength.

In prior intumescent formulations, thermoplastics have been compounded with expandable graphite or siliceous materials. The formulations include polymer matrices, acid sources, blowing agents and carbonizing ingredients. Inorganic fillers, such as glass fibers, glass powders, spheres, gypsum, particles, are sometimes included. However, there are no known formulations that include chemistries to reinforce the interaction of graphite particles and a polymer matrix. Therefore, some of the fillers, especially expandable graphite, can be detrimental to the material strength.

Preferably, new formulations presented herein may include the following ingredients: a polymer matrix, acid sources, blowing agents, char forming agents, inorganic fillers and crosslinking agents. In order to solve the problem of weak bonding between expandable graphite and the polymer matrix, vinyl silane coatings are introduced. Vinyl silane molecules may be grafted onto the expandable graphite surface. The vinyl silane may be but not limited to tris(2-methoxyethoxy)(vinyl)silane, allyltriethoxysilane, allyltrimethoxysilane, 3-butenyltriethoxysilane, vinyltriacetoxysilane, vinyltriethoxysilane, vinyltrimethoxysilane, vinyltriisopropenoxysilane, vinyltriisopropoxysilane, vinyltrimethoxysilane, vinyltris(2-methoxyethoxy)silane, vinyltris(methylethylketoximino)silane, vinylmethyldiethoxysilane, vinylmethyldimethoxysilane, trivinylmethoxysiulane.

The intumescent property of the formulation is primarily imparted by the acid source, blowing agent and char forming agent. That is, when the intumescent polymer is subject to high heat, such as fire, the polymer matrix softens. Also, the blowing agent produces gas, e.g., gas bubbles, within the polymer matrix as a result of the heat. The gas rises through the softened polymer matrix in order to escape therefrom which results in the polymer matrix expanding. The char forming agent, which in the present case is expandable graphite, forms char, i.e., carbon atoms, which solidifies the expanded polymer structure and traps the gas within the structure. The acid source acts as a catalyst to hasten the formation of char from the polymer matrix to prevent the gas from escaping before char has been formed. The inorganic fillers may also act to support and strengthen the char formation, although the inorganic fillers may also serve to strengthen the polymer structure prior to any high heat exposure. For example, glass fibers may be useful to strengthen the polymer structure during normal use thereof, but the glass fibers may also become entwined within the char formation during a high heat event, and thus, strengthen the char formation. Crosslinking agents may be useful for various purposes, but one such use as described further below, is the formation of a covalent bond between the silane treated expandable graphite and the polymer matrix (e.g., the use of vinyl).

As shown in FIG. 1, dodecyltriethoxysilane is able to graft onto a graphite surface via a hydrolysis reaction, which forms a covalent —C—O—Si—C— bond between silane molecules and graphite surfaces with hydroxyl (—OH) functionalities. Graphite oxide has sufficient hydroxyl groups on the surface, while the oxide layer may be produced by treating the graphite in acidic or basic solutions, such as nitric acid, sulfuric acid, a mixture of potassium chlorate and nitric acid, a mixture of sulfuric acid, sodium nitrate and potassium permanganate, potassium hydroxide or sodium hydroxide. After treatment, the expandable graphite surface is covered with an oxide or hydroxyl group. Both are susceptible to a grafting reaction with silane. Also, the silane molecules are able to bridge each other to form a uniform coating around the expandable graphite particles so that the expandable graphite is wrapped in a layer of a silane coating. It is understood that grafting herein refers to a covalent bond being formed between the expandable graphite and the silane.

After the coating reaction, the expandable graphite surface may have a layer with a short aliphatic chain, such as dodecyl groups. The dodecyl chains have similar chemical properties as the polymer matrix, and thus, are able to enhance the interaction between the expandable graphite and the polymer matrix via physical entanglement or van der Waals force. Thus, in these embodiments, the silane is non-covalently bonded with the polymer matrix. There are a few ways that the force may be increased. For example, the coating thickness may be increased by a multilayer coating or the length of the aliphatic chains of the silane molecules may be increased. In order to achieve a sufficient particle/matrix interaction, the side alkyl chain preferably has 4 carbon atoms or above. Alkyl silanes, such as n-butyltrimethoxysilane, pentyltriethoxysilane, hexyltriethoxysilane, isooctyltrimethoxysilane, phenyltriethoxysilane, octyltrimethoxysilane, decyltriethoxysilane, hexadecyltrimethoxysilane, octadecyltrimethoxysilane, eicosyltrichlorosilane, docosyltrichlorosilane or triacontyltrichlorosilane, may be used.

Preferably, the compounding process may be modified to accommodate for the silane coating process. For example, in a first step expandable graphite particles, as well as other inorganic fillers, such as glass fibers, carbon fibers, clays, expandable graphite, silicas (e.g., fumed silica or mica), and alumina, may be mixed with silanes. The mass ratio of the silanes to the total fillers may be 0.5~10 to 1 (e.g., 0.5~10 mass of silane molecules to 1 mass of inorganic fillers). The fillers and silane may be mixed and then compounded in a twin-screw compounder.

The compounded product may then be mixed with the rest of the ingredients. The plastic matrix may be polyethylene (PE), high-density polyethylene (HDPE), polypropylene, polycarbonate, polyester, polyvinyl acetate, polyvinyl chloride (PVC), polyether, polystyrene, polyamide (nylon), poly(ethylene terephthalate), poly(butylene terephthalate), poly(methyl methacrylate) or their copolymers. The base polymer may be in the range of 10%~90% by mass and is preferably in the range of 20%~70% by mass.

Before the compounding process, the expandable graphite particles may be treated with silane. The expandable graphite particles may be treated in silane solutions with the desired silane to expandable graphite mass ratio, ethanol, or methanol and water mixture, acid catalysts, such as hydrogen chloride, sulfuric acid or nitric acid with a concentration below 5%. After the grafting process, the treated expandable graphite particles may be washed with fresh water and dried before compounding. Silane-modified expandable graphite may be in the range of 1%~50% weight in the compounded product and preferably is in the range of 10%~40% by mass.

The acid source may include phosphoric acid, sulfuric acid, boric acid, ammonium salts (phosphates, polyphosphates, borates, polyborates or sulphates), phosphates of amine or amide (products from urea with phosphoric acids, melamine or products of reaction of ammonia with phosphorus pentoxide) or organophosphorus compounds (tricresyl phosphate, alkyl phosphate or haloalkyl phosphates). The acid source may be in the range of 1%~25%, or more preferably 5%~25%, by mass in the compounded product.

The blowing agents may be ammonium polyphosphate, melamine phosphate, urea, urea-formaldehyde resins, dicyandiamide, melamine or glycine. The blowing agents may be in the range of 5%~50%, or more preferably 15%~50%, by mass in the compounded product.

Silane-modified inorganic fillers, such as glass fibers, carbon fibers, clays, chalk, kaolin clays, talc clays, fumed silica, mica, may be in the range of 0.5%~50% by mass in the compounded product.

After mixing all of the ingredients, the mixture may be compounded in a twin-screw compounder to make the final plastic resin or resin particles before being injection molded.

Figure 2:
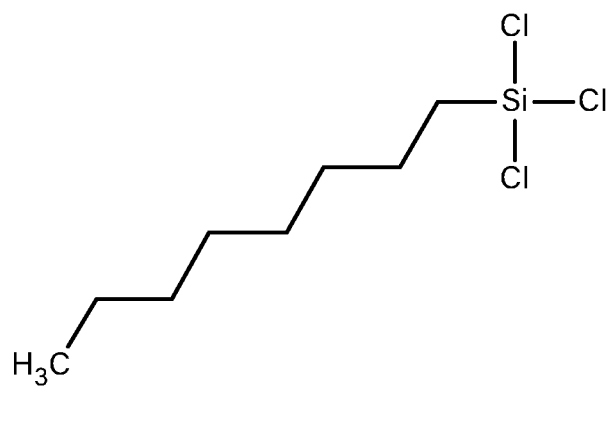
FIG. 2 is an illustration of trichloro(octyl)silane.

An alternative method of treating expandable graphite with silanes includes using silanes with a more reactive chlorosilane group. For example, trichloro(octyl)silane is shown in FIG. 2. A trichlorosilane group may readily attract to the surface of expandable graphite without additional solvents or catalysts. The reaction may proceed in liquid or via vapor deposition. In the latter case, the chlorosilane compound may be heated in a closed chamber with expandable graphite powder, where the molecules react with the surface of the expandable graphite which leading to a similar result as in the previous example, but without the washing and drying steps. The functionalization allows improved bonding of expandable graphite to the matrix resin and increased inter-particle friction due to longer chains on the expandable graphite. This results in increased mechanical performance of the final molded parts that contain the modified expandable graphite.

Figure 3:
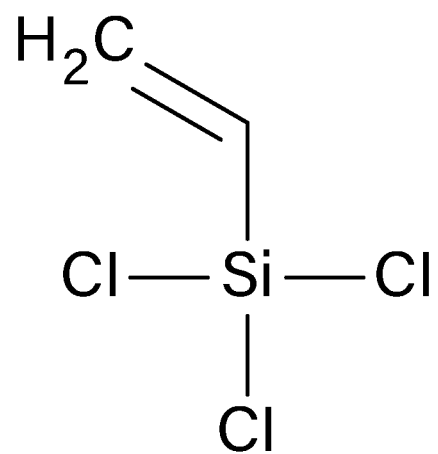
FIG. 3 is an illustration of vinyl trichlorosilane.
Figure 4:
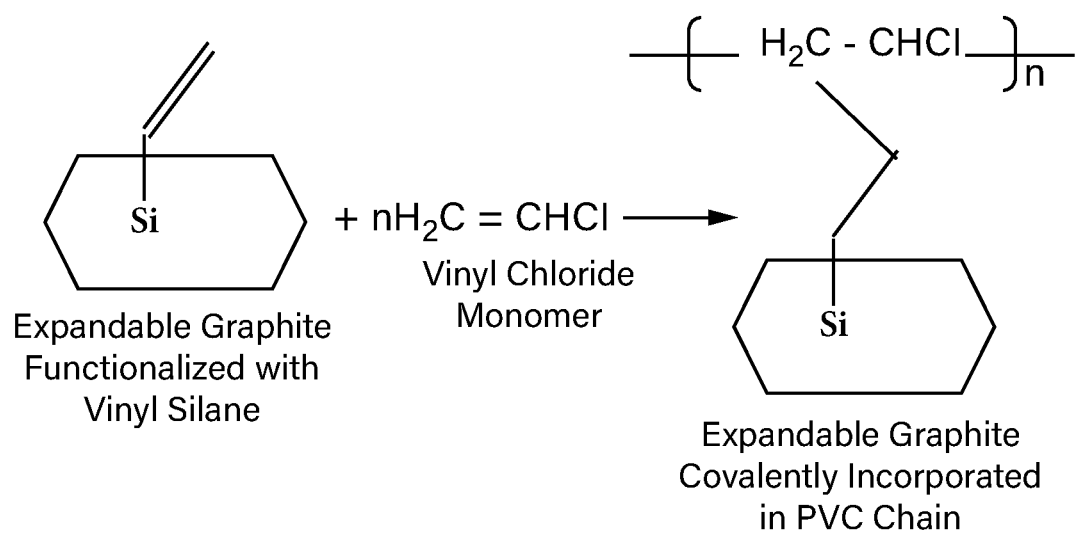
FIG. 4 is an illustration of expandable graphite covalently incorporated into polyvinyl chloride.

The silanes shown in FIGS. 2-3 allow for a different extent of bonding between the matrix and the expandable graphite. Another example, vinyl trichlorosilane is shown in FIG. 3. The vinyl group of vinyl trichlorosilane may introduce a covalent link between the matrix resin and the expandable graphite particles. In such case, the silane is covalently bonded to both the expandable graphite and the polymer matrix. Such particles may be fed into the polymer reaction toward the end of polymerization of aliphatic polymers, such as polypropylene, polyvinyl chloride, polyethylene or styrene, where the surface of the expandable graphite covalently links to the nearly grown chains of the polypropylene. For example, expandable graphite covalently incorporated into polyvinyl chloride is shown in FIG. 4. A resin with covalently attached expandable graphite particles offers even better mechanical performance over a resin with compounded expandable graphite particles.

Alternatively, expandable graphite with a reactive group (such as vinyl) may be further reacted with a long chain (where long means a molecular mass >1000 Da) polymer with a pendant reactive group, such as vinyl. The expandable graphite may then have a bulky aliphatic group attached to its surface, increasing inter-particle friction. Instead of vinyl, the group may be alcohol (—OH) and isocyanate (—NCO) to form urethane linkages.

Silanes with amino functional groups may also be used for compounding. Silanes with amino groups, such as 3-aminopropyl(diethoxy) methylsilane, [3-(2-aminoethyl)-aminopropyl] methyldimethoxysilane, [3-(2-aminoethyl)-aminopropyl] trimethoxysilane, 3-aminopropyltriethoxysilane, 3-aminopropyltrimethoxysilane, 4-aminobutyltriethoxysilane, 4-amino-3,3-dimethylbutyltrimethoxysilane, N-(2-aminoethyl)-3-aminopropyltriethoxysilane, aminophenyltrimethoxysilane, N-(2-aminoethyl)-3-aminopropyltrimethoxysilane, N-(6-aminohexyl) aminomethyltriethoxysilane, N-(2-aminoethyl)-3-aminopropylmethyldiethoxysilanetriol, may be coated on expandable graphite and other inorganic fillers. After being compounded with a polar polymer matrix, such as polyamide (nylon), poly(ethylene terephthalate), poly(butylene terephthalate) and poly(vinyl chloride), the amine groups grafted on the graphite and fillers may be associated with the polar polymer matrix via electrostatic association and hydrogen bonding. The electrostatic association and hydrogen bonding enhance the bonding between the fillers and the polymer matrix and results in improved mechanical stiffness of the compound.

Advantages of the described intumescent plastics include improved mechanical strength. The matrix may have better bonding to expandable graphite particles and expandable graphite particles may have stronger inter-particle association. A two-step compounding process may also avoid waste of materials. In the first step, expandable graphite particles may be compounded with silane molecules as a surface treatment. In the second step, the pre-treated expandable graphite particles, inorganic fillers and polymer matrix may be compounded. The intumescent materials may have an expansion rate in the range of 5 to 80 times. The intumescent thermoplastic materials may also be better designed for injection molding. The intumescent material preferably has enough strength for products used in supporting structures. The addition of glass fibers with functionalized expandable graphite may allow the formulation to have comparable strength to pure resin without modifiers.

Intumescent thermoplastics as described herein with expandable graphite may be compounded for injection molding, compression molding, transfer molding and potting of fire-retardant structures. The main intumescent ingredient may be modified expandable graphite. The expandable graphite may be modified by grafting alkyl-silane on the surface of the expandable graphite. The preferred alkyl-silanes have a long alkyl side chain. Possible candidates include alkyl silanes, such as n-butyltrimethoxysilane, pentyltriethoxysilane, hexyltriethoxysilane, isooctyltrimethoxysilane, octyltrimethoxysilane, decyltriethoxysilane, hexadecyltrimethoxysilane, octadecyltrimethoxysilane, eiscosyltrichlorosilane, docosyltrichlorosilane or triacontyltrichlorosilane. The mass ratio of the silane to expandable graphite may be 0.1~10 and is preferably in the range of 1~5. Over-grafting silane molecules on the expandable graphite may compromise the expansion reaction. A two step compounding process may be adopted. In the first step, silane and inorganic fillers may be compounded. The silane molecules and fillers (including expandable graphite) may be fed into a twin-screw compounder for compounding. In the second step, the resultant compound is then mixed with the rest of the materials for a second round compounding. The plastic matrix may be polyethylene, high-density polyethylene, polypropylene, polycarbonate, polyester, polyvinyl acetate, polyvinyl chloride, polyether, polystyrene, polyamide, poly(ethylene terephthalate), poly(butylene terephthalate), poly(methyl methacrylate) or their copolymers. The base polymer may be in the range of 10%~90% by mass and is preferably in the range of 20%~70% by mass in the compounded product. The silane-modified expandable graphite may be in the range of 5%~90% weight and is preferably in the range of 10%~40% by mass in the compounded product. The acid source may be phosphoric acid, sulfuric acid, boric acid, ammonium salts (phosphates, polyphosphates, borates, polyborates or sulphates), phosphates of amine or amide (products from urea with phosphoric acids, melamine or products of reaction of ammonia with phosphorus pentoxide) or organophosphorus compounds (tricresyl phosphate, alkyl phosphate or haloalkyl phosphates). The acid source may be in the range of 5%~25% by mass in the compounded product. The blowing agents may be ammonium polyphosphate, melamine phosphate, urea, urea-formaldehyde resins, dicyandiamide, melamine or glycine. The blowing agents may be in the range of 15%~50% by mass in the compounded product. Silane-modified inorganic fillers, such as glass fibers, carbon fibers, clays, chalk, kaolin clays, talc clays, fumed silica, mica, may be in the range of 0.5%~50% by mass in the compounded product. Expandable graphite may also be modified with chlorosilanes, such as trichloro(octyl)silane to allow a functionalization reaction in a gas phase, where expandable graphite particles may be agitated by air, mechanical means or gravity. Expandable graphite may also be incorporated into the polymer resin by forming a covalent bond between the functionalized expandable graphite and the polymer resin. Possible functionalization may be with vinyl silane on the expandable graphite particle to allow the expandable graphite to react with vinyl monomers used in the polymerization of polypropylene, polyethylene, styrene or polyvinyl chloride. Electrostatic association and hydrogen bonding may also be introduced when amino silanes, such as 3-aminopropyl(diethoxy) methylsilane, [3-(2-aminoethyl)-aminopropyl] methyldimethoxysilane, [3-(2-aminoethyl)-aminopropyl] trimethoxysilane, 3-aminopropyltriethoxysilane, 3-aminopropyltrimethoxysilane, 4-aminobutyltriethoxysilane, 4-amino-3,3-dimethylbutyltrimethoxysilane, N-(2-aminoethyl)-3-aminopropyltriethoxysilane, aminophenyltrimethoxysilane, N-(2-aminoethyl)-3-aminopropyltrimethoxysilane, N-(6-aminohexyl) aminomethyltriethoxysilane, N-(2-aminoethyl)-3-aminopropylmethyldiethoxysilanetriol, are grafted onto expandable graphite and fillers. The amino groups facilitate association with polar polymers, such as polyamide (nylon), poly(ethylene terephthalate) and poly(butylene terephthalate). Mechanical performance of the intumescent material may be increased due to increased inter-particle friction of functionalized expandable graphite with polymer chains.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. An intumescent polymer comprising:
a polymer matrix; and
an expandable graphite mixed within the polymer matrix;
wherein the expandable graphite is covalently bonded to a silane with a hydrolysis reaction,
wherein the silane is an alkyl-silane comprising a side alkyl chain comprising 4 carbon atoms or more.

2. The intumescent polymer according to claim 1, wherein the alkyl-silane comprises n-butyltrimethoxysilane, pentyltriethoxysilane, hexyltriethoxysilane, isooctyltrimethoxysilane, phenyltriethoxysilane, octyltrimethoxysilane, decyltriethoxysilane, hexadecyltrimethoxysilane, octadecyltrimethoxysilane, eiscosyltrichlorosilane, docosyltrichlorosilane or triacontyltrichlorosilane.

3. An intumescent polymer comprising:
a polymer matrix;
an expandable graphite mixed within the polymer matrix; and
wherein the expandable graphite is covalently bonded to a silane,
wherein the silane is a chlorosilane.

4. The intumescent polymer according to claim 3, wherein the expandable graphite is covalently bonded with the chlorosilane in a gas phase.

5. The intumescent polymer according to claim 3, wherein the chlorosilane is trichloro(octyl)silane or vinyl trichlorosilane.

6. An intumescent polymer comprising:
a polymer matrix;
an expandable graphite mixed within the polymer matrix; and
wherein the expandable graphite is covalently bonded to a silane,
wherein the silane is non-covalently bonded to the polymer matrix.

7. An intumescent polymer comprising:
a polymer matrix;
an expandable graphite mixed within the polymer matrix;
wherein the expandable graphite is covalently bonded to a silane, and
wherein the silane is covalently bonded to the polymer matrix,
wherein the silane is vinyl silane.

8. The intumescent polymer according to claim 7, wherein the vinyl silane comprises tris(2-methoxyethoxy)(vinyl)silane, allyltriethoxysilane, allyltrimethoxysilane, 3-butenyltriethoxysilane, vinyltriacetoxysilane, vinyltriethoxysilane, vinyltrimethoxysilane, vinyltriisopropenoxysilane, vinyltriisopropoxysilane, vinyltrimethoxysilane, vinyltris(2-methoxyethoxy)silane, vinyltris(methylethylketoximino)silane, vinylmethyldiethoxysilane, vinylmethyldimethoxysilane, trivinylmethoxysiulane.

9. An intumescent polymer comprising:
a polymer matrix;
an expandable graphite mixed within the polymer matrix; and
wherein the expandable graphite is covalently bonded to a silane,
wherein the silane comprises amino groups, and the polymer matrix is a polar polymer matrix.

10. The intumescent polymer according to claim 7, wherein the polymer matrix comprises a vinyl monomer.

11. The intumescent polymer according to claim 1, wherein a mass ratio of the silane to the expandable graphite is between 0.1 and 10 to 1.

12. An intumescent polymer comprising:
a polymer matrix;
an expandable graphite mixed within the polymer matrix;
wherein the expandable graphite is covalently bonded to a silane, and
wherein the polymer matrix comprises between 20% and 70% of the intumescent polymer by mass and the expanded graphite with the silane comprises between 10% and 40% of the intumescent polymer by mass,
wherein the polymer matrix comprises polyethylene, high-density polyethylene, polypropylene, polycarbonate, polyester, polyvinyl acetate, polyvinyl chloride, polyethers, polystyrene, poly(methyl methacrylate), polyamide, poly(ethylene terephthalate), poly(butylene terephthalate) or a copolymer thereof.

13. An intumescent polymer comprising:
a polymer matrix;
an expandable graphite mixed within the polymer matrix; and
wherein the expandable graphite is covalently bonded to a silane,
wherein the intumescent polymer further comprises an inorganic filler treated with the silane, the inorganic filler comprising glass fibers, carbon fibers, clays, chalk, kaolin clays, talc clays, fumed silica or mica.

14. The intumescent polymer according to claim 13, wherein the inorganic filler comprises between 0.5% and 50% of the intumescent polymer by mass.

15. An intumescent polymer comprising:
a polymer matrix;
an expandable graphite mixed within the polymer matrix; and
wherein the expandable graphite is covalently bonded to a silane,
wherein the expandable graphite is covalently bonded with the silane in a first compounding, and the expandable graphite with the silane is mixed with the polymer matrix in a second compounding.

16. An intumescent polymer comprising:
a polymer matrix;
an expandable graphite mixed within the polymer matrix; and
wherein the expandable graphite is covalently bonded to a silane,
wherein the intumescent polymer is injection molded, compression molded, transfer molded or potted.

* * * * *